March 16, 1943. F. M. SMITH 2,314,319
WING FRAME ASSEMBLY FIXTURE
Filed April 13, 1942 3 Sheets-Sheet 3

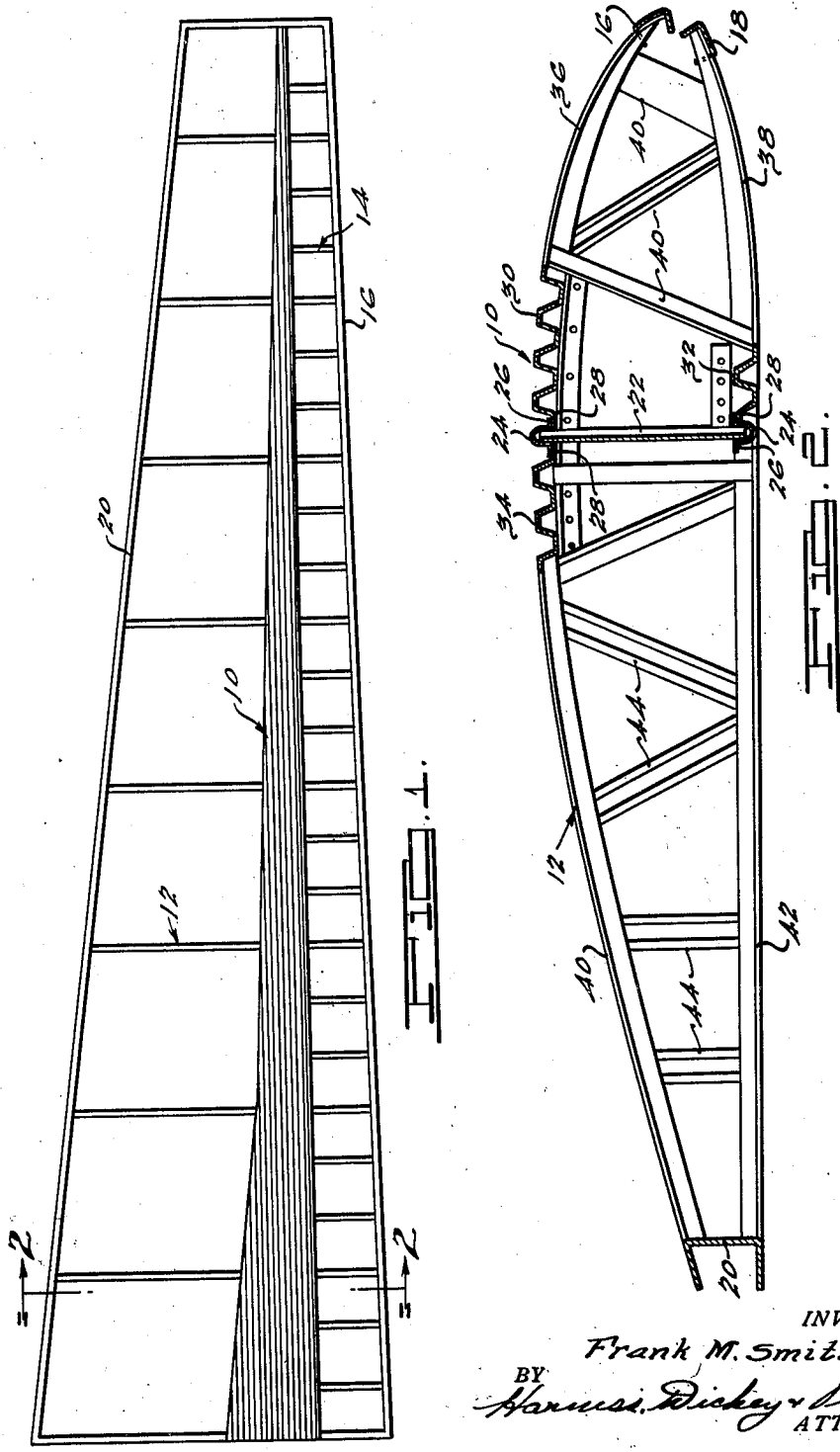

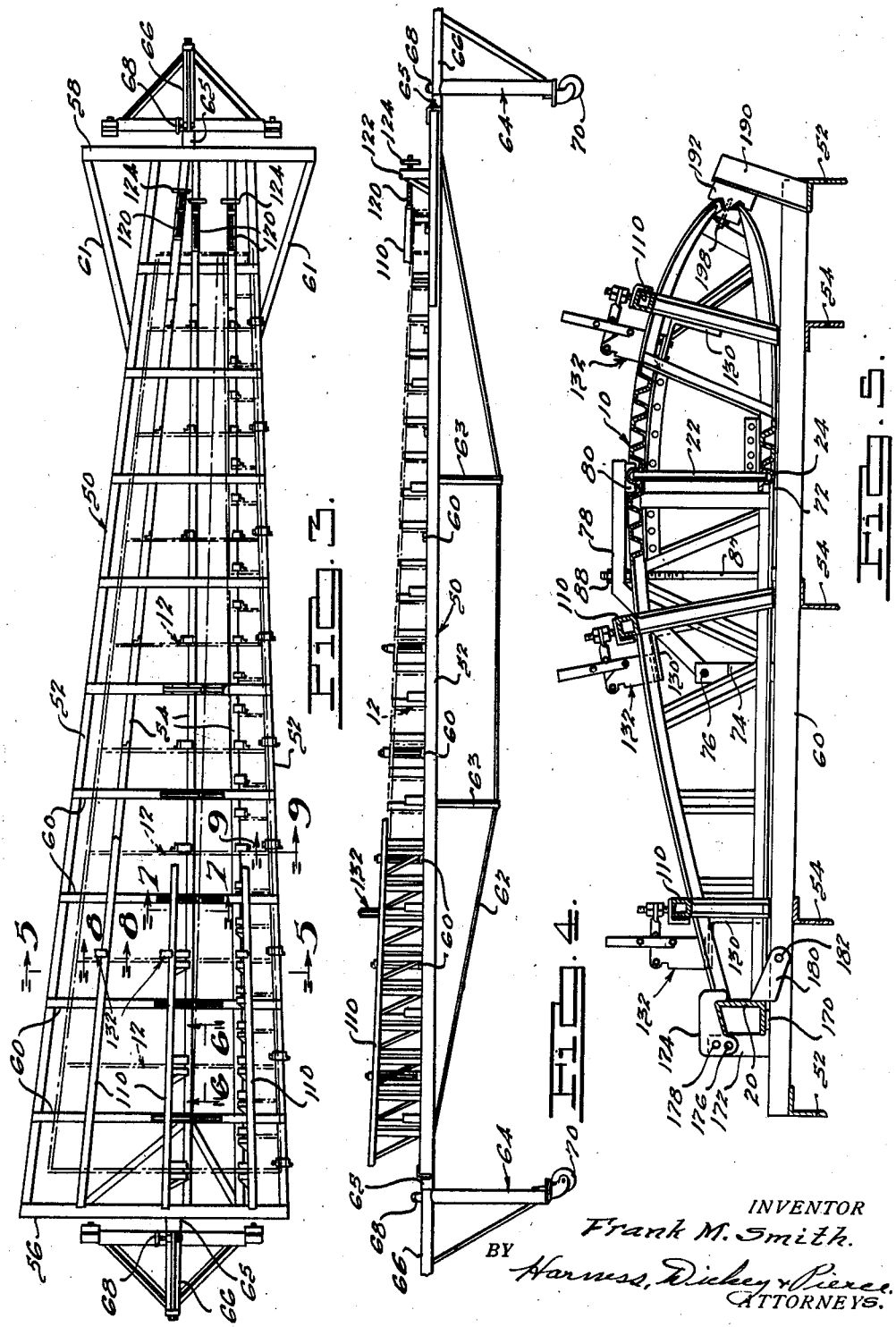

INVENTOR
Frank M. Smith.
BY
Harness, Dickey & Pierce.
ATTORNEYS.

Patented Mar. 16, 1943

2,314,319

UNITED STATES PATENT OFFICE 2,314,319

WING FRAME ASSEMBLY FIXTURE

Frank M. Smith, Dearborn, Mich., assignor, by mesne assignments, to Consolidated Aircraft Corporation, San Diego, Calif.

Application April 13, 1942, Serial No. 438,691

9 Claims. (Cl. 29—89)

This invention relates to jigs or fixtures for assembling the framework of airplane wings and the principal object is the provision of a jig or fixture of the type described by the use of which the assembly of airplane wing frames may be accomplished in a quick and accurate manner.

Objects of the invention include the provision of a jig or fixture upon which the various component parts of an airplane wing frame may be quickly located in clamping position with respect to each other whereby to enable the various component parts of the framework to be secured to each other; the provision of a jig or structure of the type described in which a novel form of means is provided for locating and quickly clamping the various rib sections of the wing frame in position; the provision of a jig or fixture of the type described so constructed and arranged as to require a minimum number of individual clamping operations to be performed in the locating and clamping of the various wing frame parts with respect to each other; and the provision of a jig or fixture of the type described including various new and novel details of construction.

The above being among the objects of the present invention the same consists of certain new and novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a plan view of a representative type of airplane wing frame to which the present invention is applicable;

Fig. 2 is an enlarged transverse sectional view taken on the line 2—2 of Fig. 1;

Fig. 3 is a plan view of my improved jig or fixture employed for assembling the wing frame shown in the preceding views;

Fig. 4 is a side elevational view of the jig or fixture shown in Fig. 3;

Fig. 5 is an enlarged, transverse sectional view taken on the line 5—5 of Fig. 3 and showing parts of a wing frame in position with respect thereto;

Figure 8:
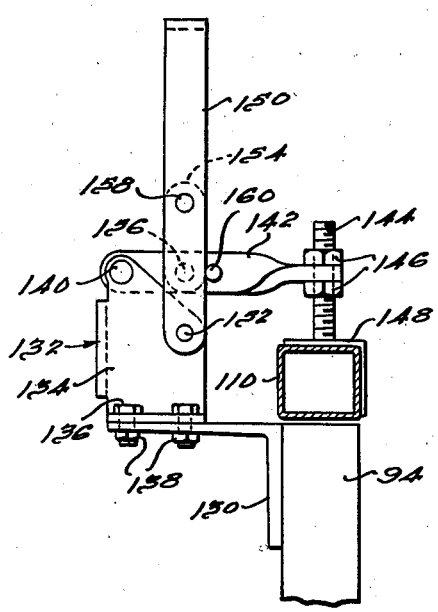
Figure 9:
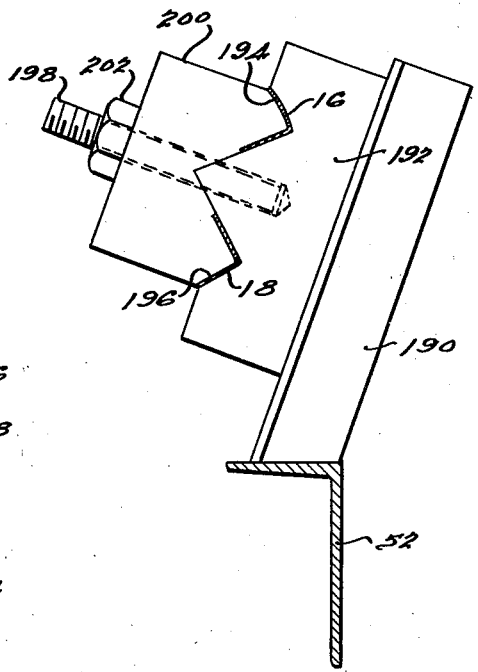

Fig. 8 is an enlarged transverse sectional view taken on the line 8—8 of Fig. 3 and illustrating in greater detail the releasable clamping means associated with the longitudinally extending rib clamping members; and, Fig. 9 is an enlarged transverse sectional view taken on the line 9—9 of Fig. 3 and illustrating in greater detail the clamping mechanism employed in connection with the leading edge members of the framework for the airplane wing frame shown in Fig. 1 and showing such leading edge members in clamped relation therewith.

It will, of course, be appreciated that the jig or fixture of the present invention is applicable for use in the manufacture of airplane wing frames whether they be for the right or the left-hand wing of an airplane and without regard to the specific construction of the particular wing frame, as long as it consists in one or more spars extending longitudinally of the wing or spanwise of the corresponding airplane and a plurality of spaced ribs extending longitudinally of the associated airplane or transversely of the length of the wing. The jig or fixture must, of course, be constructed to take either a righthand or a left-hand wing frame, and must be constructed in each instance to take the particular construction of the wing frame which it is desired to build. Primarily as a matter of illustration only, the wing frame shown in Figs. 1 and 2 has been selected as the one for which the illustrative embodiment of the present invention shown in the following views has been constructed to accommodate in the manufacture thereof.

Referring to Figs. 1 and 2 the wing frame there shown comprises a spar indicated generally at 10, a plurality of full ribs indicated generally at 12, a plurality of leading edge rib sections indicated generally at 14, a pair of members 16 and 18 cooperating to form a leading edge member for the wing frame, and a trailing edge member 20. The wing spar 10 shown forms the subject matter of my application for Letters Patent of the United States for improvements in Spar structure for airplane wings, filed May 9, 1941, and serially numbered 392,679, and reference may be had thereto for a more detailed description of its construction and of the construction of the wing frame itself if a more detailed explanation and description of the same than herein given is desired.

Briefly, the spar shown consists of a vertically directed web 22 and top and bottom flanges associated therewith. The web 22 is formed from thin sheet metal and is corrugated over its length with the direction of the corrugations vertical or transverse to the length of the web. The top and bottom flanges of the spar 10 each include a cap member 24 which cap members are of a length equal to the length of the web 22 and each of which comprises a channel-sectioned member within the channel of which the corresponding edge of the web 22 is received and secured, and outwardly directed flanges 26 on either side thereof. The remainder of the top and bottom flanges of the spar 10 are formed from relatively thin sheet metal which is corrugated with the length of the corrugations extending longitudinally of the length of the spar 10. Each flange portion or member is provided with a marginal flange 28 which is arranged in overlapping relationship with respect to the corresponding flange 26 on the same side of the web 22 and is rigidly fixed thereto as by welding, riveting, or the like. In the particular case shown there is a flanged member 30 on the forward side of the web 22 at the upper edge thereof and a flange 32 on the forward side of the web 22 at the lower edge thereof. A flanged member 34 is located at the upper edge of the web 22 and on the trailing edge side thereof but, as illustrated in Fig. 1, this tapers from a maximum width at the root end of the wing frame to zero width at a point intermediate the root and tip of the wing frame.

The ribs 12 are each made up in a forward section and a rearward section and, as best brought out in Fig. 2, each forward section comprises an upper shape forming element 36, a lower shape forming element 38, and a plurality of braces or struts 40 extending therebetween. The forward ends of the elements 36 and 38 are spaced from each other and are joined respectively to the leading edge forming members 16 and 18. Their rear edges are suitably joined to the forward edges of the flange members 30 and 32, respectively. The rear section of each full rib 12 comprises an upper shape forming member 40 and a lower shape forming member 42 rigidly interconnected together by a plurality of struts or braces 44 and they are joined together at their rear ends through the trailing edge member 20. The forward ends of the upper members 40 are joined to the rear edge of the upper rear flange member 34 where they are located within the length of the latter, otherwise they are secured directly to the rear flange 26 of upper cap member 24. The forward end of the lower members 42 are secured directly to the lower cap member 24 as indicated.

The leading edge rib sections 14 are substantially identical to the leading edge portions of the full ribs 12 already described and are secured to the spar 10 in a substantially identical manner.

In manufacturing a wing frame such as shown the spar 10 is built up as a separate unit, the rear portion of each full rib 12 is built up as a separate unit, the front portion of each full rib 12 and each leading rib edge portion 14 is built up as a separate unit, and then all are assembled and secured together with the leading edge members 16 and 18 and trailing edge member 20 and such other elements as may be necessary or desirable to provide as component parts of the wing structure. Each of these various component parts of the wing frame assembly may be built up in an accurate manner on a jig or fixture individually provided therefor so that in the final wing frame assembly jig or fixture comprising the present invention all that is required is to locate the various rib sections with respect to each other and to the spar 10, suitably locate the leading edge members 16 and 18 and trailing edge member 20, and then secure all of these parts together. The jig or fixture comprising the present invention is intended to accurately locate all of these various elements in their desired relative position with respect to each other so that they may be secured relative to one another with the required accuracy to form the desired final product.

Referring now particularly to Figs. 3 and 4 it will be observed that the jig or fixture of the present invention comprises what may be termed a rigid base indicated generally at 50 and formed more or less as a rigid framework including angled sectioned longitudinally extending side members 52, a plurality, in the particular case shown three, similarly sectioned generally spaced intermediate longitudinally extending members 54, end member 56 and 58 tying the corresponding ends of the members 52 and 54 together, and a plurality of cross-members 60 which are arranged with their length disposed transversely of the length of the base 50 and which extend between the opposite side members 52 and are rigidly secured thereto and to the intermediate members 54. The righthand end member 58 extends outwardly beyond both side members 52 and its free ends are braced with respect to the side members 52 by brace members 61. The base 50 may be further rigidified if desired by one or more tension members such as 62 trained over struts 63 as indicated in Fig. 4.

For the purpose of facilitating the assembly of an airplane frame upon the base 50 the base 50 is preferably supported for rotation about a line extending longitudinally therethrough and for this purpose a dolly indicated generally at 64 is located at each end of the base 50 and serves to rotatably support such end. This is accomplished by means of a pair of trunnion members 65 which project outwardly from opposite ends of the base 50 with their axes in alignment with the desired axis of rotation for the base 50. The trunnion members are each rotatably received in a split sleeve 66 carried at the upper end of the corresponding dolly 64. Each split sleeve 66 may be contracted about the corresponding trunnion member 65 by means of a hand screw 68 thus to enable the base 50 to be locked against rotation in any adjusted position of rotation about its rotatable axis. The dollys 64 are preferably provided with castors 70 to facilitate the shifting of the jig or fixture to any desired position or location.

The spar 10 is located in position on the base 50 in the following manner. As best brought out in Fig. 5 the crossbars are each provided on their upper face with a block 72 the upper face of which is grooved out to relatively closely fit the lower cap member 24 of the spar 10 so that when the spar 10 is applied to the base 50 with the lower cap member 24 received in the grooves of the corresponding blocks 72 the lower face of the spar 10 is accurately located transversely of the base 50.

Figure 7:
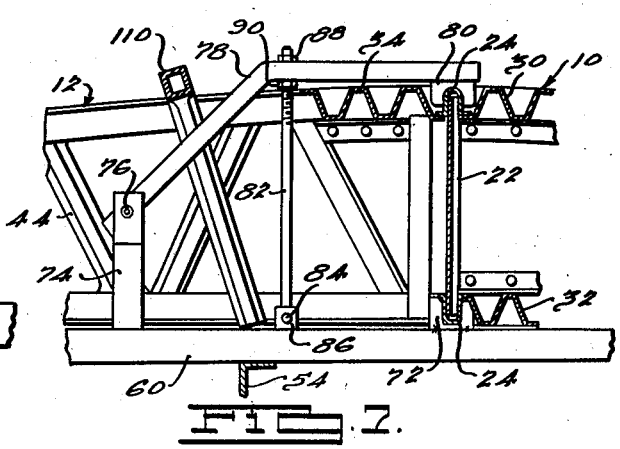
Fig. 7 is an enlarged fragmentary, transverse sectional view taken on the line 7—7 of Fig. 3 and illustrating in greater detail the spar locating and clamping means associated therewith and illustrating a spar and a rib operatively associated therewith.

In order to hold the spar 10 down firmly in position on the block 72 and to locate and maintain the spar with its web 22 in the desired upstanding relation with respect to the plane of the upper face of the base 50 the following mechanism is provided as best brought out in Figs. 5 and 7. Referring to the latter figure it will be noted that a rigid pedestal bracket 74 is rigidly secured to the upper face of each member 60 in laterally spaced relation with respect to the corresponding block 72 and toward the trailing edge portion of the wing frame therefrom. The upper end of each bracket 74 is bifurcated and pivotally secured therein by means of a pin 76 is one end of a rigid angular clamping member 78. When the clamping member 78 is in operative position as illustrated in Figs. 5 and 7 the free end thereof extends over the top of the spar 10, and on its underside is provided with a block 80 which is substantially identical to the block 72 and within the downwardly facing groove of which the upper cap member 24 of the spar 10 is adapted to be relatively closely received. The block 80 is so located on the clamping bar 78 that when the clamping bar 78 is in the operative position shown it serves to locate the upper side of the spar 10 in proper lateral position with respect to the base 50 and with the web 22 of the spar 10 in proper vertical relation with respect to the plane of the upper face of the base 50. Although each cross bar 60 will carry a clamping bar 78, for the purpose of simplicity in the drawing, in Figs. 3 and 4 only a few of the cross bars 60 are shown as so provided.

In order to maintain each clamping bar 78 in clamping position a rod 82 is pivotally connected as at 84 between the opposite sides of a bifurcated bracket 86 fixed to the corresponding cross-member 60 midway between the block 72 and the bracket 74. The upper end of the rod 82 is threaded and projects through the clamping bar 78 between the opposite ends of the latter and above the bar 78 receives a nut 88 thereon by means of which the clamping bar 78 may be drawn into clamping relation with respect to the spar 10. If desired another nut 90 may be threaded on the rod 82 below the clamping bar 78 so as to provide an adjustable means for limiting the clamping action of the clamping bar 78, that is the force that it may be caused to apply to the spar 10, as well as to serve as a means in conjunction with a nut 88 for locking the nut 88 against inadvertent loosening. Suitable stop means, not shown, carried by the base 50 are arranged for abutment with one end of the spar 10 for locating the spar longitudinally of the base 50. Thus by the means above described provisions are made for accurately locating and releasably clamping the spar 10 in position on the base 50.

In order to locate the various rib sections in proper longitudinal and vertical relation with respect to the spar 10 in the jig or fixture the following mechanism is provided. Rigidly fixed to each of the longitudinally extending members 54 and projecting upwardly therefrom are a plurality of rigid stop or locating members or brackets 94. As best brought out in Fig. 6 each member 94 is formed from metal and is of angular section and is rigidly fixed to the corresponding members 54 at its lower end and is braced in position by means of a bracing element 96 extending between the upper end thereof and the corresponding member 54. Also as brought out in Fig. 6 the members 94 are each positioned a short distance towards the right as viewed in Figs. 3 and 4 from the desired location of the corresponding rib sections 12 or 14 to be located thereby and the height of the members 94 vary in accordance with the height of the particular rib section to be located thereby and are of substantially the same height as the particular rib section to be located thereby at the point in the length of the rib section where it is intended to engage it.

Locating blocks 98 are secured to the lefthand face of each stop member 94 for engagement with the upper and lower shape forming members of the rib section to be received thereby so that when such rib section is placed in contact with the lefthand face thereof as viewed in the drawings it will be arranged in the desired accurately located relation with respect to the spar 10 longitudinally thereof.

Figure 6:
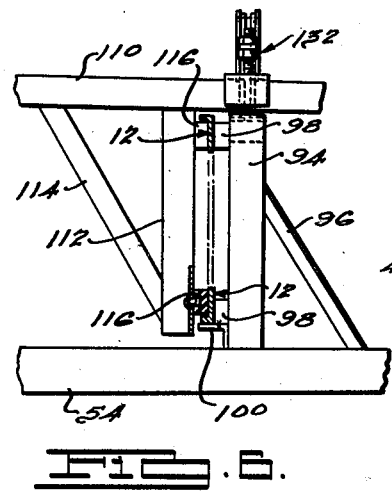
Fig. 6 is an enlarged, fragmentary, partially broken, partially sectioned view taken on the line 6—6 of Fig. 3 illustrating details of the rib clamping means and a rib in clamped position with respect thereto.

In order to locate the bottom elements of the various rib sections 12 and 14 in the desired spaced relation with respect to the upper face of the base 50, each stop member 94 is provided with an abutment element 100 fixed to the lefthand face thereof as viewed in the drawings and adjacent the bottom thereof as illustrated in Fig. 6 for receiving and supporting the lower shape forming element. While in the particular embodiment shown there is only one longitudinal row of members 94 for locating the forward rib sections with respect to the spar and two rows of members 94 for locating the rear rib sections with respect to the spar, it will be appreciated that any desired numbers of rows of these members may be employed either because of the desires of the designer or necessity in the particular frame construction being produced.

In order to clamp the various rib sections against the locating blocks 98 carried by the stop members 94 the following mechanism is provided. Extending over the tops of the various rib sections are a plurality of longitudinally extending clamping members 110, there being a companion one for each longitudinally extending member 54 and lying approximately directly above it. In the particular construction shown and indicated in various figures of the drawings, the members 110 are of square section and are hollow. Each member 110 has rigidly fixed thereto a plurality of downwardly extending clamping arms 112. The same number of clamping members 112 fixed to each member 110 as the companion longitudinally extending members 54 has upwardly extending stop members 94 thereon, and the clamping members 112 are spaced from one another in exact accordance with the spacing of the stop members 94 on the companion member 54. As best brought out in Fig. 6 the clamping members 112 are of such length that when the corresponding member 110 is resting upon the upper surface of the associated rib sections 12 and 14 the clamping members 112 extend into adjacent relationship with respect to but in spaced relation from the upper surface of the companion member 54.

As best brought out in Fig. 6 each clamping member 112 is braced against movement on its corresponding member 110 by means of a brace 114 extending between its free end and the corresponding member 110 at a point spaced from the point of connection of the clamping member 112 therewith. As also best brought out in Fig. 6 each clamping member 112 has fixed to the righthand face thereof, as viewed in the drawing, a clamping pad 116, the pads 116 being positioned in substantial alignment longitudinally of the jig or fixture with the stop blocks 98 carried by the associated stop member 94. The clamping pads 116 are preferably formed of a resilient material such as rubber or the like.

It will be observed particularly from an inspection of Figs. 3 and 5 that the stop members 94 projecting outwardly from the lefthand longitudinally extending member 54 project substantially perpendicularly with respect to the upper face of the base 50. The stop members 94 on the next longitudinally extending member 54 to the right as viewed in Fig. 5 in extending upwardly are also inclined to the left as viewed in Fig. 5, and those on the next longitudinally extending member to the right in extending upwardly are inclined to the right. The clamping members 112 on the companion members 110 are either straight or inclined in accordance with the companion stop members 94 so that when arranged in the operative relation with respect to each other as indicated in Fig. 6 each companion stop members 94 and clamping member 112 lie in fully opposed relation with respect to each other. This arrangement of these parts is not only for the purpose of enabling the various rib sections to be more satisfactorily located thereby but also for the purpose of insuring the center member 110 clearing the various clamping bars 78 as will be readily appreciated from an inspection of Fig. 5.

As will be appreciated from an inspection of Fig. 6 the members 110 with the clamping bars 112 and clamping pads 116 thereon are provided for the purpose of clamping the various rib sections against the stop or locating blocks 98 carried by the various stop members 94. In order to effect this clamping movement the righthand ends of members 110, as viewed in Figs. 3 and 4, each terminate in a threaded rod or shaft 120 and each such rod or shaft 120 extends through a bracket 122 suitably fixed to the upper face of the companion member 54 adjacent the righthand end of the base 50 and to the right of such bracket threadably receives thereon a handwheel 124. Thus it will be appreciated that by turning the handwheel 124 the various members 110 may be drawn bodily to the right as viewed in Figs. 3, 4, and 6 and thus move the various clamping members 112 to the right therewith. When the various rib sections 12 and 14 are positioned against the stop blocks 98 of the various stop members 94 and the various members 110 are positioned as shown, when the handwheels 124 are turned to draw the members 110 to the right the clamping pads 116 act against the corresponding upper and lower elements of the rib sections to firmly press them against the lefthand faces of the stop blocks 98 on the corresponding stop members 94, thus to accurately locate them longitudinally of the base 50 with respect to the spar 10 and securely clamping them in such position. Any small variations in the relative positions of the stop members 94 and clamping members 112 are readily taken up by yielding of the clamping pads 116 as will be readily appreciated so that proper clamping of all the rib sections is assured.

In thus drawing up the members 110 to clamp the various rib sections in position against the stop members 94 it will be appreciated that unless otherwise guarded against there might be danger of a tendency of the members 110, and at least those ends thereof opposite the handwheels 124, to slip upwardly with respect to the clamping members 94. Furthermore, it is desirable to provide some means for insuring that the various rib sections are held down firmly against their corresponding bottom stops 100. This is taken care of by the provision of the following described clamping means. Each stop member 94 is provided with an angle bracket 130 fixed to the lefthand face thereof, as viewed in Figs. 5 and 8, and each angle bracket 113 supports thereon a clamping device indicated generally at 132. For the purpose of simplicity in drawing in Figs. 3 and 4, only a portion of such angle brackets and clamping devices are shown. As best shown in Fig. 8, in which one of such clamping devices 132 is shown in detail, each comprises a sheet metal body portion 134 which is fixed to the corresponding bracket 130 by means of screws 136 and nuts 138. Pivotally secured by means of a pin 140 to the upper portion of the main body portion 134 and to the lefthand side thereof as viewed in Fig. 8 is a clamping arm 142. A stud 144 projects perpendicularly through the free or righthand end of the clamping arm 142 and is locked in longitudinally adjustable position with respect thereto by means of the nuts 146. The lower end of the stud 144 has fixed thereto an angular clamping member 148 which, as indicated in Fig. 8, is adapted to engage the top and one side face of the associated member 110.

In order to operate the clamping arm 142 an operating arm 150 is pivotally mounted at one end by means of a pin 152 to the main body portion 134 at a point to the right and below the pin 140 as viewed in Fig. 8. A short link 154 is pivotally secured by means of a pin 156 to the clamping arm 142 midway between its opposite ends and at its opposite end is pivotally connected by means of a pin 158 to the operating arm 150 at a point above the clamping arm 142 as viewed in Fig. 8. A stop pin 160 fixed to the clamping arm 142 and projecting outwardly therefrom into the path of movement of the operating arm 150 is preferably provided for limiting movement of the operating arm 150 to the right as viewed in Fig. 8.

It will be appreciated from the above that if the operating arm 150 is moved in a counterclockwise direction of rotation about its pin 152 from the position illustrated in Fig. 8, during such movement the link 154 will cause the clamping arm 142 to also be pivoted in a counterclockwise direction of rotation about its pivot pin 140, thus releasing the clamping member 148 from the member 110 and drawing it up and to the left out of interfering relation with respect thereto. It will be appreciated that the nuts 146 may be adjusted so that when the operating arm 150 is pivoted to the position illustrated in Fig. 8 the clamping member 148 will press downwardly upon the member 110 with the desired degree of pressure and, if the arm 150 is moved to bring the center of the pivot pin 158 slightly to the right of the line connecting the centers of the pivot pins 152 and 156 as viewed in Fig. 8, the operating arm 150 will be automatically held in its clamping position. It will also be appreciated that in thus pressing the members 110 downwardly by means of the clamping members 132, the members 110 in pressing against the upper elements of the various rib sections 12 and 14 will force such rib sections downwardly into contact with the corresponding stop members 100. Thus the clamping devices 132 not only serve to prevent the various members 110 from lifting during a clamping operation but also serve to maintain the various rib sections against their corresponding stop members 100 thus to accurately locate them vertically with respect to the face of the base 50.

In order to properly locate and secure the trailing edge member 20 with respect to the rear ends of the various rear rib sections the following mechanism is provided. As best brought out in Fig. 5, blocks 170 are provided on the upper face of each of the cross-members 60 for reception of the trailing edge member 20 and for locating it at the proper vertical position above the face of the base 50. Outwardly of each stop or locating block 170 an upwardly projecting bracket 172 is fixed to each cross-member 60 with its right-hand edge, as viewed in Fig. 5, located in the position where it is desired to locate the rear edge of the trailing edge member 20 and thus forming an abutment for the same. A clamping lever 174 is pivotally connected to each bracket 172 by means of a pin 176 and one edge thereof is formed for complementary reception of the upper face and the upper margin of the forward face of the trailing edge member 20 when in operative relation with respect thereto as indicated in Fig. 5, the clamping members 174 thus serving to clamp the upper portion of the trailing edge member 20 securely against the forward faces of the stop members or brackets 172 as will be readily appreciated. In order to prevent the clamping members 172 from being inadvertently displaced from their clamping position, a removable pin 178 is projected through each bracket 172 and its corresponding clamping arm 174 in spaced relation with respect to the pivot pin 176 thereof.

In order to clamp the lower edge of the trailing edge member 20 against the various stop brackets 152, a lever 180 is pivotally connected by means of a pin 182 to the side face of each cross-member 60 at a point a short distance to the right of the forward edge of the trailing edge member 20 as illustrated in Fig. 5. The free ends of the clamping levers 180 are beveled off as indicated and the levers are of such length that when the trailing edge member 20 is in position against the various stop brackets 172, the free ends of the levers may be pressed against the lower marginal edge of the forward face of the trailing edge member 20 to thus force it rearwardly, or to the left as viewed in Fig. 5, and hold the lower wall of the trailing edge member 20 against the associated face of the corresponding stop member 172.

In order to properly locate and clamp the leading edge members 16 and 18 in position relative to the base 50 the following mechanism best illustrated in Figs. 5 and 9 is provided. As illustrated in these figures and as also brought out in Figs. 3 and 4 the side member 52 on that side of the base 50 along which the leading edge of the framework is to be located is provided with a plurality of upstanding and outwardly inclined brackets 190, preferably located slightly out of line with various ribs to be provided in the framework. Each bracket 190, as brought out in Figs. 5 and 9, has fixed to its lefthand face a block 192 each of which is provided with two V-shaped notches 194 and 196 in its lefthand face which are complementary in shape to the cross-sectional configuration of the leading edge members 16 and 18, respectively, and are so positioned that when such leading edge members are received therein they are located in the desired relation with respect to the remaining parts of the wing frame assembly to be built up in the jig or fixture. Between the notches 194 and 196 each block 192 is provided with an outwardly projecting stud 198 upon which is slidably received a clamping block 200. The righthand face of each clamping block 200 is formed for complementary reception within the opposed faces of the leading edge members 16 and 18 when received in the corresponding notches 194 and 196. A nut 202 threaded upon each stud 198 serves to draw the corresponding blocks 200 inwardly on the studs 198 and to force the leading edge members 16 and 18 into position in the notches 194 and 196 and to securely clamp them in such condition.

In the use of the above described jig or fixture, the spar 10, the leading edge members 16 and 18, and the trailing edge member 20 are first positioned in place and loosely clamped in position, then the various rib sections 12 and 14 are placed in position against the stop blocks 98 of the various stop members 94 and arranged in proper relation with respect to the spar, leading edge members and trailing edge members, the various members 110 are then applied in position and are drawn up by the handwheels 124 into approximately final position, the leading edge members, the trailing edge members, and the spar are then firmly clamped in their intended position, the clamps 132 are operated to press the various members 110 downwardly and thus properly locate the various rib sections vertically and then the handwheels 124 are operated to complete the clamping of the various rib sections against their corresponding stop blocks 198, thus locating all the parts of the wing frame in proper relation with respect to each other and in the position in which it is desired to secure them together. This being accomplished all the cooperating parts of the wing frame may then be riveted, welded or otherwise suitably secured with respect to each other after which they may be released from clamping relation with respect to the jig or fixture and removed in the form of a complete wing frame all parts of which are accurately located with respect to each other in the desired relation and ready for reception of the skin or covering.

It will be appreciated that with the structure thus shown and described and particularly by the use of the longitudinally extending members 110 each with a plurality of clamping members 112 thereon, the number of individual clamping operations required to be executed in locating the various parts of the framework and clamping them in their thus located position is materially reduced as compared to jigs or fixtures heretofore provided for the same intended purpose, and this without in any sense detracting from the desired accuracy in the locating and securing of the various parts of the framework in position for securement to each other.

Having thus described my invention, what I claim by Letters Patent is:

1. In a jig for building airplane wing frames or the like, in combination, a rigid base, a plurality of outstanding abutment elements rigidly fixed to said base, a plurality of longitudinally extending members arranged in generally spaced relation with respect to each other and said base, a plurality of outstanding elements fixed with respect to each of said longitudinally extending members and spaced longitudinally thereof from one another by a distance substantially equal to the longitudinal spacing of certain of said first mentioned abutment elements from each other, whereby to enable them to be positioned in opposed relation with respect to said abutment elements, spar locating means fixed with respect to said base, and means for moving said longitudinally extending members longitudinally of said base thereby to clamp a rib between each outstanding element thereof and the corresponding abutment element of said base.

2. In a jig for the manufacture of airplane wing frames, a rigid base, a plurality of outwardly projecting stop elements rigidly fixed to said base and arranged in rows longitudinally thereof, a longitudinally extending member arranged in overlying relationship with respect to said base in line with each of said rows, means interconnecting each of said longitudinally extending members with said base for effecting relative longitudinal movement therebetween, and a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement between said base and said longitudinally extending members.

3. In a jig for the manufacture of airplane wing frames, a rigid base, a plurality of outwardly projecting stop elements rigidly fixed to said base and arranged in rows longitudinally thereof, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement between said base and said longitudinally extending members, spar locating means carried by said base, and releasable clamping means cooperable between said base and spar to maintain said spar in engagement with sair spar locating means.

4. In a jig for the manufacture of airplane wing frames, a rigid base, a plurality of outwardly projecting stop elements rigidly fixed to said base and arranged in rows longitudinally thereof, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement between said base and said longitudinally extending members, spar locating means carried by said base, front edge locating means carried by said base, and clamping means associated with each of said front edge locating means for fixing a front edge element with respect thereto.

5. In a jig for the manufacture of airplane wing frames, a rigid base, a plurality of outwardly projecting stop elements rigidly fixed to said base and arranged in rows longitudinally thereof, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement therebetween said base and said longitudinally extending members, spar locating means carried by said base, front edge locating means carried by said base, clamping means associated with each of said front edge locating means for fixing a front edge element with respect thereto, trailing edge locating means fixed to said base, and means for locking a trailing edge member in fixed position with respect to said trailing edge locating means.

6. In a jig for the manufacture of airplane wing frames, a rigid base, a plurality of outwardly projecting stop elements rigidly fixed to said base and arranged in rows longitudinally thereof, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement between said base and said longitudinally extending members, spar locating means carried by said base, front edge locating means carried by said base, clamping means associated with each of said front edge locating means for fixing a front edge element with respect thereto, trailing edge locating means fixed to said base, means for locking a trailing edge member in fixed position with respect to said trailing edge locating means, releasable clamping means for maintaining said longitudinally extending members against movement away from said base, releasable clamping means cooperable between said base and spar to maintain said spar in engagement with said spar locating means, and means for supporting said base for bodily rotation about a line extending longitudinally thereof.

7. In a jig for the manufacture of airplane wing frames, a rigid base, a plurality of outwardly projecting stop elements rigidly fixed to said base and arranged in rows longitudinally thereof, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member, and yieldable clamping pads on said outstanding elements adapted for engagement with ribs to be clamped against said stop elements.

8. In a jig for the manufacture of airplane wing frames, a rigid base, a plurality of outwardly projecting stop elements rigidly fixed to said base and arranged in rows longitudinally thereof, a stop member associated with each of said stop elements providing a stop face in perpendicular relation thereto, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement between said base and said longitudinally extending members, means for pressing said longitudinally extending members towards said base and against said ribs whereby to hold said ribs against said stop face, spar locating means carried by said base, and releasable clamping means cooperable between said base and spar to maintain said spar in engagement with said spar locating means.

9. In a jig for the manufacture of airplane wing frames, a rigid base, a plurality of outwardly projecting stop elements rigidly fixed to said base and arranged in rows longitudinally thereof, a stop member associated with each of said stop elements providing a stop face in perpendicular relation thereto, a longitudinally extending member arranged in overlying relationship with respect to said base in line with each of said rows, means interconnecting each of said longitudinally extending members with said base for effecting relative longitudinal movement therebetween, a plurality of outstanding elements fixed to each of said longitudinally extending members and spaced longitudinally of said longitudinally extending members in accordance with the longitudinal spacing of said stop elements in line therewith whereby to enable a rib to be clamped between each outstanding stop element on said base and its corresponding outstanding element on said longitudinally extending member upon relative longitudinal movement between said base and said longitudinally extending members, a releasable clamping device carried by each of at least a portion of said outwardly projecting stop members and engageable with said longitudinally extending members to press them inwardly against said ribs, spar locating means carried by said base, and releasable clamping means cooperable between said base and spar to maintain said spar in engagement with said spar locating means.

FRANK M. SMITH.